United States Patent
Hayashi

(10) Patent No.: US 7,454,900 B2
(45) Date of Patent: Nov. 25, 2008

(54) CATALYST RECOVERY METHOD

(75) Inventor: Kotaro Hayashi, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 288 days.

(21) Appl. No.: 10/968,908

(22) Filed: Oct. 21, 2004

(65) Prior Publication Data

US 2005/0109014 A1 May 26, 2005

(30) Foreign Application Priority Data

Oct. 28, 2003 (JP) ............................. 2003-367378

(51) Int. Cl.
*F01N 3/00* (2006.01)

(52) U.S. Cl. .............................. 60/295; 60/274; 60/285; 60/301

(58) Field of Classification Search .................. 60/274, 60/276, 285, 295, 301
See application file for complete search history.

(56) References Cited

U.S. PATENT DOCUMENTS

| | | | |
|---|---|---|---|
| 5,402,641 A * | 4/1995 | Katoh et al. ................... | 60/285 |
| 6,021,638 A * | 2/2000 | Hochmuth .................... | 60/274 |
| 6,164,064 A * | 12/2000 | Pott ............................ | 60/295 |
| 6,171,565 B1 | 1/2001 | Hone et al. | |
| 6,327,849 B1 * | 12/2001 | Sugiura et al. ................. | 60/277 |
| 6,530,216 B2 * | 3/2003 | Pott ............................ | 60/274 |
| 6,843,052 B2 * | 1/2005 | Hertzberg et al. .............. | 60/274 |
| 6,941,748 B2 * | 9/2005 | Pott et al. ..................... | 60/274 |
| 2003/0106306 A1 | 6/2003 | Nakatani et al. | |
| 2004/0112042 A1 * | 6/2004 | Hoffmann et al. .............. | 60/274 |
| 2004/0123585 A1 | 7/2004 | Yamaguchi et al. | |

FOREIGN PATENT DOCUMENTS

| | | |
|---|---|---|
| EP | 1 318 282 | 6/2003 |
| FR | 2 838 479 | 4/2003 |
| JP | A 6-88518 | 3/1994 |
| JP | A-6-307230 | 11/1994 |
| JP | A 11-107827 | 4/1999 |
| JP | A 2001-82137 | 3/2001 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

A catalyst recovery method is capable of maintaining NOx purification performance by efficiently releasing SOx occluded in a NOx catalyst in an exhaust system of an internal combustion engine. The air fuel ratio of exhaust gas in a fuel supply period ($\Delta t1$) is made further richer (C2) than a predetermined rich air fuel ratio (C0) with increasing length of a set stop period ($\Delta t2$). Provided within a stop period ($\Delta t2$) is an excessively lean period ($\Delta t3$) in which the air fuel ratio of the exhaust gas becomes higher (C3) with increasing length of the stop period ($\Delta t2$), whereby an amount of reducing agent to be added is increased, thus making it possible to ensure a sufficient amount of SOx released from the NOx catalyst. As a result, the length of the stop period ($\Delta t2'$) is shortened, so the SOx occluded in the NOx catalyst can be efficiently released.

3 Claims, 7 Drawing Sheets

US 7,454,900 B2

CATALYST RECOVERY METHOD

This application claims the benefit of Japanese Patent Application No. 2003-367378, filed Oct. 28, 2003.

FIELD OF THE INVENTION

The present invention relates to a method for recovering or regenerating a catalyst.

DESCRIPTION OF THE RELATED ART

As lean-burn internal combustion engines such as diesel engines or the like capable of burning a lean mixture, there have hitherto been known ones having a NOx storage reduction catalyst (hereinafter also referred to simply as a NOx catalyst) installed on an exhaust system.

A fuel used in an internal combustion engine might contain sulfur components, and in this case, an exhaust gas emitted from the internal combustion engine contains sulfur oxides (SOx), which are absorbed by a NOx storage reduction catalyst as in the case of nitrogen oxides (NOx). The sulfur oxides (SOx) absorbed in the NOx storage reduction catalyst are not able to be easily released even under the condition that nitrogen oxides (NOx) are able to be released from the NOx storage reduction catalyst. Therefore, if the internal combustion engine is continuously operated, there will take place so-called SOx poisoning in which sulfur oxides (SOx) are accumulated in the NOx storage reduction catalyst.

As a method for preventing or suppressing SOx poisoning, there has been known a method for performing so-called SOx poisoning recovery (or regenerating) control in which sulfur oxides (SOx) are released from the NOx storage reduction catalyst by raising the temperature of an NOx storage reduction catalyst and at the same time intermittently making the air fuel ratio of an exhaust gas equal to the stoichiometric air fuel ratio or an air fuel ratio slightly richer than the stoichiometric air fuel ratio (for example, see a first patent document: Japanese patent application laid-open No. H06-88518 (JP, H06-88518 A)).

In addition, the following patent documents are also known as relevant to the present invention.
JP, H11-107827, A
JP, 2001-82137, A However, the period or duration of execution of the SOx poisoning recovery control sometimes becomes long depending upon the operating condition of the internal combustion engine. For example, when the engine operating condition is in a state that the temperature of the exhaust gas becomes high, such as in the state of high-speed operation, it is necessary to perform the SOx poisoning recovery control while preventing an excessive rise in the temperature of the NOx storage reduction catalyst, so the period of execution of the SOx poisoning recovery control is liable to be longer.

Since the amount of reduction components to be oxidized by the NOx storage reduction catalyst increases when the air fuel ratio of the exhaust gas is made rich, the temperature of the NOx storage reduction catalyst becomes easy to rise, and in particular, when the exhaust gas temperature is high, the NOx storage reduction catalyst is liable to rise in temperature:

Accordingly, when the exhaust gas temperature is high, it is necessary to prevent an excessive rise in the temperature of the NOx storage reduction catalyst by shortening the period of time for which the air fuel ratio of the exhaust gas is rich. When the period of time of the air fuel ratio of the exhaust gas being rich is shortened, it becomes difficult for SOx to be released from the NOx storage reduction catalyst, with the result that the efficiency of the SOx poisoning recovery control is decreased.

Further, in order to prevent or suppress an excessive rise in the temperature of the NOx storage reduction catalyst, the NOx storage reduction catalyst has to be cooled, with the air fuel ratio of the exhaust gas being first made rich and then lean. However, when the exhaust gas temperature is high, the amount of the heat transmitted from the NOx storage reduction catalyst to the exhaust gas decreases, so it becomes difficult for the temperature of the NOx storage reduction catalyst to be lowered.

Accordingly, when the exhaust gas temperature is high, it is necessary to extend or increase the period of time for which the air fuel ratio of the exhaust gas is lean so as to cool the NOx storage reduction catalyst to a satisfactory extent. When the period of time of the air fuel ratio of the exhaust gas being lean is extended, the frequency in which the air fuel ratio of the exhaust gas is made rich decreases, and hence the efficiency of the SOx poisoning recovery control is accordingly decreased.

SUMMARY OF THE INVENTION

The present invention has been made in view of the circumstances as stated above, and has for its object to provide a catalyst recovery method which is capable of causing the SOx absorbed in an NOx storage reduction catalyst to be released therefrom in an efficient manner, thereby making it possible to maintain the NOx purification performance of the NOx storage reduction catalyst at an appropriate level.

In order to achieve the above object, the present invention adopted the following solution.

That is, in one aspect, the present invention resides in a method for recovering or regenerating sulfur poisoning of an NOx storage reduction catalyst by executing a rich step of bringing an exhaust gas flowing into an NOx storage reduction catalyst into a reducing atmosphere and a lean step of bringing the exhaust gas flowing into the NOx storage reduction catalyst into an oxidative atmosphere in an alternate manner, wherein the air fuel ratio of the exhaust gas flowing into the NOx storage reduction catalyst in at least one of the rich step and the lean step is controlled in accordance with the length of at least one of the rich step and the lean step.

More specifically, there is provided a catalyst recovery method comprising a rich step of bringing an exhaust gas flowing into an NOx storage reduction catalyst installed on an exhaust passage of a lean-burn internal combustion engine into a reducing atmosphere thereby to raise the temperature of the NOx storage reduction catalyst and to release sulfur oxides occluded in the NOx storage reduction catalyst; and a lean step of bringing the exhaust gas flowing into the NOx storage reduction catalyst into an oxidative atmosphere thereby to lower the temperature of the NOx storage reduction catalyst raised in the rich step; and a recovery step of executing the rich step and the lean step in an alternate manner thereby to recover or regenerate sulfur poisoning of the NOx storage reduction catalyst; wherein the air fuel ratio of the exhaust gas flowing into the NOx storage reduction catalyst in at least one of the rich step and the lean step is controlled based on the length of at least one of the rich step and the lean step.

Preferably, in the SOx poisoning recovery control, the length of the rich step and/or the length of the lean step are/is changed in accordance with the engine operating condition. For example, in order to prevent an excessive rise in the temperature of the NOx storage reduction catalyst when the engine operation condition is such that the exhaust gas temperature becomes high, the ratio of the length of the rich step to the length of the lean step is lowered (i.e., at least one of the extension (increase) of the lean step and the shortening (decrease) of the rich step is performed).

According to the present invention, when the length of the rich step and/or the length of the lean step are/is changed in this manner, sulfur poisoning of the NOx storage reduction catalyst can be efficiently recovered or regenerated by changing the air fuel ratio of exhaust gas in the rich step and/or the air fuel ratio of exhaust gas in the lean step in accordance with the amount of change in the length of the rich and/or lean step.

For example, the air fuel ratio of the exhaust gas flowing into the NOx storage reduction catalyst in the rich step may be made lower in accordance with the increasing length of the lean step and/or the decreasing length of the rich step. In that case, the air fuel ratio of exhaust gas in the rich step may be decided in accordance with the length of the lean step just before the rich step.

When the air fuel ratio of exhaust gas in the rich step lowers as the ratio of the length of the rich step to the length of the lean step lowers in this manner, it becomes difficult for the amount of the SOx released from the NOx storage reduction catalyst in the rich step to decrease even if the length of the rich step becomes shorter. As a result, even when the length of the rich step is shortened and/or the length of the lean step is extended, the decrease in the efficiency of the SOx poisoning recovery control can be suppressed to a limited level.

Here, note that it has been considered that white smoke generates when the air fuel ratio of exhaust gas is excessively lowered, and hence the air fuel ratio of exhaust gas in the rich step has not been made lower than a predetermined rich air fuel ratio. In contrast to this, the inventor of the present application has found that when the rich step is shortened and the lean step is extended or increased, the generation of white smoke becomes difficult even if the air fuel ratio of exhaust gas in the rich step is made lower than the predetermined rich air fuel ratio. Therefore, even where the air fuel ratio of the exhaust gas flowing into the NOx storage reduction catalyst in the rich step is lowered, in accordance with the increasing length of the lean step or the decreasing length of the rich step, it is possible to suppress the decrease in the efficiency of the SOx poisoning recovery control while suppressing the generation of white smoke.

The air fuel ratio of the exhaust gas flowing into the NOx storage reduction catalyst in the lean step may be made higher in accordance with the increasing length of the lean step or the decreasing length of the rich step. When the air fuel ratio of the exhaust gas in the lean step is raised in this manner, the oxidation reaction heat generated in the NOx storage reduction catalyst decreases, so the temperature of the NOx storage reduction catalyst becomes easy to fall. As a consequence, the length of the lean step can be shortened so that the frequency in which the air fuel ratio of exhaust gas is made rich increases, thus making it possible to decrease the reduction in the efficiency of the SOx poisoning recovery control.

As methods for raising the air fuel ratio of exhaust gas in the lean step, there can be exemplified a method of decreasing the amount of fuel injected into the internal combustion engine, a method of decreasing the amount of reducing agent added to the exhaust gas at a location upstream of the occlusion reduction NOx catalyst, a method of increasing the amount of intake air supplied to the internal combustion engine, a method of supplying secondary air to the exhaust gas at a location upstream of the occlusion reduction NOx catalyst, a method of decreasing the amount of exhaust gas recirculation (EGR) gas, and so on.

According to, among the above-mentioned methods, the method of increasing the amount of intake air supplied to the internal combustion engine, the method of supplying secondary air to the exhaust gas at a location upstream of the occlusion reduction NOx catalyst, and the method of decreasing the amount of EGR gas, the heat or thermal capacity of the exhaust gas flowing into the NOx storage reduction catalyst increases, and hence the temperature of the NOx storage reduction catalyst becomes much easier to fall.

The air fuel ratio of exhaust gas in the lean step may be raised in the entire period of the lean step or in a part of the period of the lean step.

By the way, when the SOx poisoning recovery control is executed, the amount of the exhaust gas flowing into the NOx storage reduction catalyst might be restricted (decreased). This is because when the amount of the exhaust gas flowing into the NOx storage reduction catalyst is restricted, it is possible to decrease the amount of fuel and/or the amount of reducing agent needed to lower the air fuel ratio of exhaust gas in the rich step.

In cases where the present invention is applied to an internal combustion engine in which the amount of exhaust gas is restricted during the execution of SOx poisoning recovery control, the restriction on the amount of exhaust gas may be canceled or lifted in at least part of the lean step. In this case, the thermal capacity of the exhaust gas flowing into the NOx storage reduction catalyst increases, so the temperature of the NOx storage reduction catalyst becomes able to lower in a short time. Accordingly, the length of the lean step can be shortened, hence the frequency in which the air fuel ratio of exhaust gas is made rich can be increased. As the result, the operation time of the SOx poisoning recovery control can be shortened. Here, note that the cancel of the restriction on the amount of exhaust gas in the lean step may be carried out regardless of the length of the rich step or the lean step.

The above-mentioned various configurations can be adopted in any possible combinations thereof.

According to the present invention, it is possible to maintain NOx purification performance of the NOx catalyst by efficiently releasing the SOx occluded in the NOx catalyst in the exhaust system of the internal combustion engine.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Now, preferred embodiments of the present invention will be described below in detail while referring to the accompanying drawings.

Figure 1:
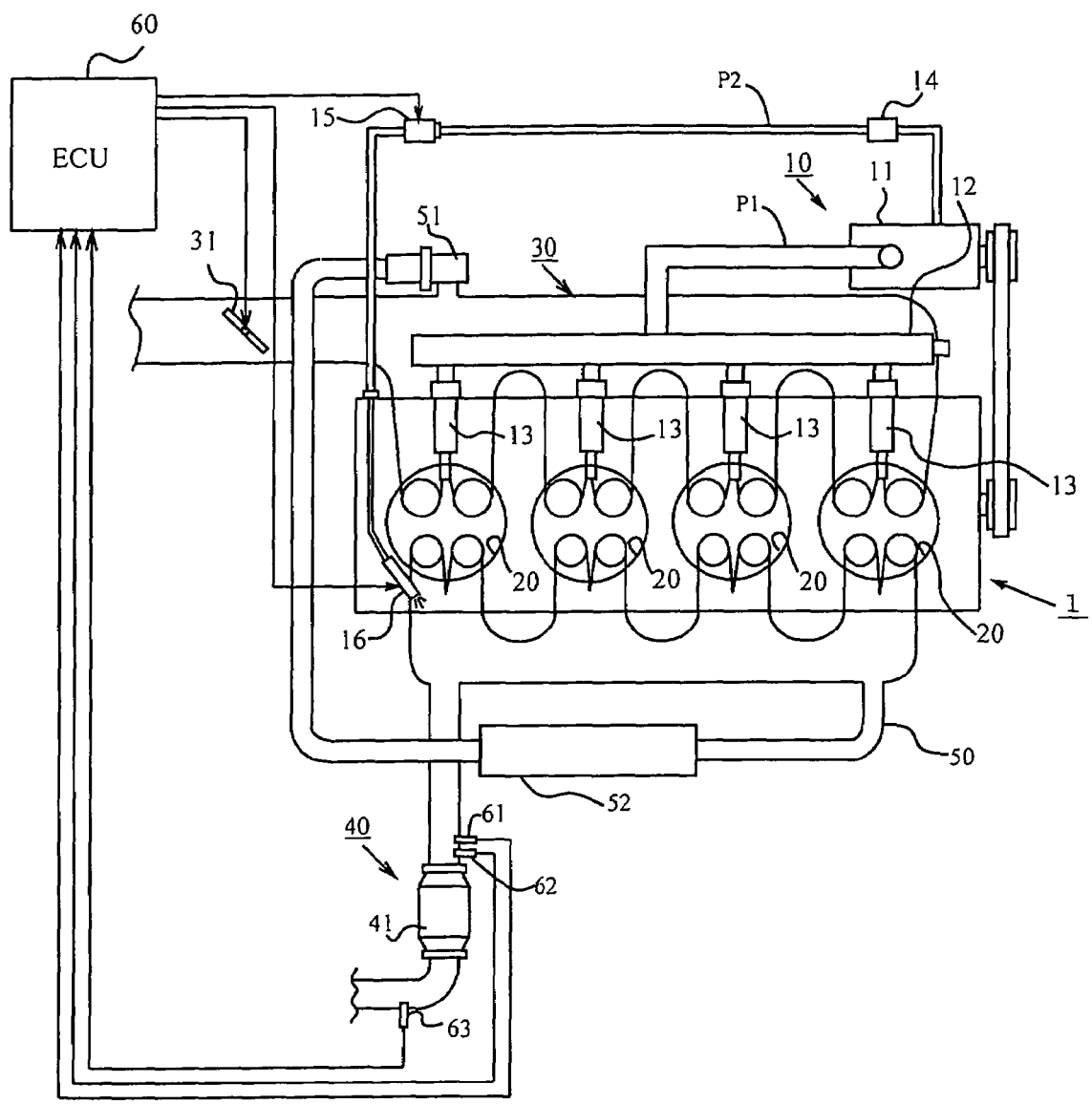
FIG. 1 is a schematic view showing an internal combustion engine to which a catalyst recovery method according to the present invention is applied.

FIG. 1 is a view that illustrates the schematic construction of an internal combustion engine to which the present invention is applied. The internal combustion engine, generally designated at reference numeral 1 in FIG. 1, is an in-line four-cylinder diesel engine which includes, as its major components, a fuel supply system 10, a combustion chamber 20 defined in each cylinder, an intake system 30, an exhaust system 40, etc.

The fuel supply system 10 includes a fuel supply pump 11, a common rail 12, fuel injection valves 13, a shutoff valve 14, a metering valve 15, a reducing agent addition valve 16, an engine fuel passage P1, a fuel addition passage P2, etc.

The fuel supply pump 11 serves to draw up fuel from a fuel tank (not shown) and supply it to the common rail 12 through the engine fuel passage P1 while pressurizing the fuel thus drawn up. The common rail 12 serves to maintain the fuel supplied thereto from the fuel supply pump 11 at a predetermined pressure (accumulation of pressure), and distribute the thus pressurized fuel to the respective fuel injection valves 13. The fuel injection valves 13 are in the form of electromagnetic valves each incorporating therein an electromagnetic solenoid (not shown), and are controlled to be opened at appropriate timing to supply fuel to the respective combustion chambers 20 through fuel injection.

Also, the fuel supply pump 11 supplies a part of the fuel drawn up from the fuel tank to the reducing agent addition valve 16 through the fuel addition passage P2. The shutoff valve 14 and the metering valve 15 are installed on the fuel addition passage P2 in this order from the fuel supply pump 11 to the reducing agent addition valve 16. The shutoff valve 14 serves to shut off or interrupt the fuel addition passage P2. The metering valve 15 serves to adjust the pressure PG of the fuel (fuel pressure) to be supplied to the reducing agent addition valve 16. The reducing agent addition valve 16 is composed of an electromagnetic valve having an electromagnetic solenoid (not shown) incorporated therein as in the case of the fuel injection valves 13, and serves to supply fuel as a reducing agent to the exhaust system 40 at a location upstream of the NOx catalyst 41.

The intake system 30 serves to form a passage (intake passage) for intake air supplied to the respective combustion chambers 20, whereas the exhaust system 40 serves to provide a passage (exhaust passage) for exhaust gases discharged from the respective combustion chambers 20.

A throttle valve 31 installed on the intake system 30 is in the form of an electronically controlled opening and closing valve, the degree of opening of which is able to be adjusted in a stepless manner, and which has a function to change under a prescribed condition the flow area of the intake passage for intake air passing therethrough thereby to adjust the amount (flow rate) of the intake air to be supplied to the respective combustion chambers 20.

The intake system 30 and the exhaust system 40 are placed in communication with each other through an exhaust gas recirculation passage (EGR passage) 50. Installed on the EGR passage 50 are an exhaust gas recirculation valve (EGR valve) 51 for adjusting the flow rate of exhaust gas (EGR gas) flowing through the EGR passage 50, and an exhaust gas recirculation cooler (EGR cooler) 52 for cooling the exhaust gas flowing through the EGR passage 50.

The NOx catalyst 41 is installed on the exhaust system 40 at a location downstream of a connecting portion thereof with the EGR passage 50. This catalyst 41 is in the form of a NOx storage reduction catalyst (hereinafter referred to as the NOx catalyst 41).

In addition, various kinds of sensors are mounted on the internal combustion engine 1. For example, an air fuel ratio (A/F) sensor 61 is installed on the exhaust system 40 at a location upstream of the NOx catalyst 41. An exhaust gas temperature sensor 62 is arranged at an inlet portion of the NOx catalyst 41 from which the exhaust gases discharged from the respective combustion clambers 20 flow into the NOx catalyst 41. A NOx sensor 63 is installed on the exhaust system 40 downstream of the NOx catalyst 41. These various kinds of sensors are electrically connected to an electronic control unit (ECU) 60.

The ECU 60 is in the form of an arithmetic logic circuit including a CPU, a ROM, a RAM, a backup RAM, a timer counter and the like. The ECU 60 serves to control the fuel injection valves 13, the EGR valve 51, the throttle valve 31 and the like based on the detection signals of the various kinds of sensors.

For example, the ECU 60 performs fuel injection control on the basis of the operating condition of the internal combustion engine 1 obtained from the detection signals of various kinds of sensors. In this embodiment, the fuel injection control means a series of processes for the execution of injection of fuel into the respective combustion chambers 20 by means of the corresponding fuel injection valves 13, including setting parameters such as the amount of fuel injection Q, injection timing, injection patterns, etc., and performing the opening and closing operations of the individual fuel injection valves 13 based on the parameters thus set.

The ECU 60 repeatedly executes such a series of processes at predetermined time intervals during the operation of the internal combustion engine 1. The amount of fuel injection Q and the injection timing are basically determined on the basis of the amount of depression ACC of an accelerator pedal (not shown) and the number of revolutions per minute NE of the internal combustion engine 1.

Also, the ECU 60 controls the internal combustion engine 1 to generate output power by performing fuel injection (main injection) at a point near the compression top dead center. In addition, the ECU 60 performs sub-injection such as post injection in which fuel is injected, separately from the main injection, during the exhaust stroke or during the expansion stroke, or vigom injection in which fuel is injected, separately from the main injection, at a point near the top dead center of the intake stroke or the exhaust stroke.

In the post injection, the fuel injected during the exhaust stroke or during the expansion stroke flows into the NOx catalyst 41 as unburnt fuel, and is oxidized there under the action of the NOx catalyst 41, so that the heat (oxidation reaction heat) generated upon oxidation of the unburnt fuel serves to raise the temperature of the NOx catalyst 41.

In the vigom injection, the fuel that has been injected at the point near the top dead center of the intake stroke or the exhaust stroke is evaporated in the subsequent stroke, so that it becomes easy to fire, thus making the combustion thereof stable. Thus, the time for main injection is able to be delayed. When the main injection is delayed in this manner, the thermal energy discharged from the internal combustion engine 1 together with the exhaust gas increases, so the exhaust gas temperature is accordingly raised. As a result, the NOx catalyst 41 receives the heat of the exhaust gas and its temperature is raised. In addition, when the timing of the main injection is retarded, the unburnt fuel contained in the exhaust gas increases and is oxidized in the NOx catalyst 41, so the heat generated upon oxidation of the unburnt fuel also acts to raise the temperature of the NOx catalyst 41.

Further, the ECU 60 performs exhaust gas recirculation control (EGR control) on the basis of the operating condition of the internal combustion engine 1 obtained from the detection signals of the various kinds of sensors. In this embodiment, the EGR control means a process that controls the EGR valve 51 in a manner as to adjust the flow rate of the gas passing through the EGR passage 50, i.e., the flow rate of the exhaust gas returned from the exhaust system 40 to the intake system 30.

A target quantity of opening of the EGR valve 51 is basically determined on the basis of the operating condition of the internal combustion engine 1 such as the load, the number of revolutions per minute of the engine, etc. The ECU 60 updates this target quantity of valve opening at predetermined time intervals when the internal combustion engine 1 is being operated. The EGR valve 51 is controlled so that the actual quantity of opening of the EGR valve 51 matches the updated target quantity of valve opening.

The ECU 60 can provide the same effect as that obtained by the above-mentioned sub-injection by adding fuel from the reducing agent addition valve 16 to the exhaust system 40. In that case, the ECU 60 adjusts the amount of fuel added from the reducing agent addition valve 16 to the exhaust system 40 by adjusting the degree of opening of the metering valve 15.

The fuel added from the reducing agent addition valve 16 to the exhaust system 40 tends to be easily held in the state of polymer and to be distributed in nonuniformity as compared with the fuel supplied by sub-injection, and hence has an advantage that reactions in the NOx catalyst 41 are promoted. In addition, the fuel addition by the reducing agent addition valve 16 also has another advantage that the degrees of freedom of the amount of fuel that can be added at one time as well as the timing of fuel addition are greater than those in the case of fuel sub-injection.

Now, reference will be made to the operation of the NOx catalyst 41. The NOx catalyst 41 is formed of a porous material such as, for example, cordierite, and more specifically, it comprises a carrier made of alumina (Al2O3) for example, at least one first component member supported on the carrier and selected from alkali metals such as potassium (K), sodium (Na), lithium (Li), cesium (Cs) and the like, alkaline earth such as barium (Ba), calcium (Ca) and the like, and rare earth such as lantern (La), yttrium (Y) and the like, and a second component member also supported on the carrier and made of a noble metal such as platinum (Pt) or the like acting as an oxidation catalyst (noble metal catalyst).

The NOx catalyst 41 thus constructed occludes (absorbs and/or adsorb) the NOx in the exhaust gas when the air fuel ratio of the incoming exhaust gas is a lean air fuel ratio, whereas it releases the NOx occluded therein to the exhaust gas so as to be reduced when the air fuel ratio of the incoming exhaust gas is the stoichiometric air fuel ratio or a rich air fuel ratio.

When the internal combustion engine 1 is operated in a lean-burn mode, the air fuel ratio of the exhaust gas discharged from the internal combustion engine 1 becomes a lean atmosphere (oxidative atmosphere), and hence the NOx contained in the exhaust gas is occluded in the NOx catalyst 41. When the lean-burn operation of the internal combustion engine 1 is continued for an extended period of time, the NOx occlusion capability of the NOx catalyst 41 is saturated so that the NOx in the exhaust gas comes to be released into the atmosphere without being occluded by the NOx catalyst 41.

Particularly, in case where the internal combustion engine 1 is a diesel engine, it is operated to run by combustion of a mixture of a lean air fuel ratio in the majority of the engine operating range. Accordingly, the air fuel ratio of the exhaust gas becomes a lean air fuel ratio in the majority of the engine operating range. When the air fuel ratio of the exhaust gas becomes a lean air fuel ratio in the majority of the engine operating range, the NOx occlusion capability of the NOx catalyst 41 becomes easily saturated. In this connection, note that the lean air fuel ratio referred to herein means a range of the A/F (air fuel ratio) being equal to 20-50 for example, in the diesel engine, in which NOx cannot be purified by a three way catalyst.

Accordingly, when the internal combustion engine 1 is in lean-burn operation, it is necessary to lower the oxygen concentration of the exhaust gas flowing into the NOx catalyst 41 and at the same time to increase the concentration of the reducing agent, thereby reducing the NOx occluded in the NOx catalyst 41 before the NOx occlusion capability of the NOx catalyst 41 is saturated. Thus, the ECU 60 executes rich spike control that serves to bring the air fuel ratio of the exhaust gas flowing into the NOx catalyst 41 into a rich air fuel ratio in a spike-like manner (for a short time) at a short cycle.

In the rich spike control, the ECU 60 makes, at prescribed time periods, a determine as to whether a rich spike control execution condition holds. As such a rich spike control execution condition, there are enumerated the following conditions for example. That is, the NOx catalyst 20 is in its activated state; the value of the output signal of the exhaust temperature sensor 62 is lower than or equal to a prescribed upper limit; and SOx poisoning recovery control is not executed.

When it is determined that the rich spike control execution condition as stated above holds, the ECU 60 controls to temporarily make rich the air fuel ratio of the exhaust gas flowing into the NOx catalyst 41 by adding fuel from the reducing agent addition valve 16 to the exhaust gas in a spike manner. Thus, when the air fuel ratio of the exhaust gas temporarily becomes a rich air fuel ratio, the NOx occluded in the NOx catalyst 41 can be reduced.

At the time when the rich spike control is being executed, the air fuel ratio of the exhaust gas flowing into the NOx catalyst 41 comes to alternately repeat a "lean" state and a "rich" state at a relatively short cycle. As a result, the NOx catalyst 41 alternately repeats the occlusion and the release (reduction) of NOx, so the NOx occlusion capability of the NOx catalyst 41 becomes not easily saturated.

The NOx catalyst 41 occludes the sulfur oxides (SOx) contained in the exhaust gas according to the same mechanism as in the case of NOx. As the amount of occlusion of the SOx increases, there takes place sulfur poisoning (SOx poisoning) in which the NOx occlusion capability of the NOx catalyst is reduced.

When the SOx poisoning occurs in the NOx catalyst 41 in this manner, the NOx occlusion capability becomes easily saturated, so there is a possibility of the NOx in the exhaust gas to be released into the atmosphere without being purified by the NOx catalyst 41.

In case where the NOx catalyst 41 suffers from SOx poisoning, the ECU 60 performs SOx poisoning recovery control. In the SOx poisoning recovery control, the ECU 60 carries out catalyst temperature raising control for raising the temperature of the NOx catalyst 41 up to a predetermined temperature (about 600-650° C. for example). After the NOx catalyst 41 has risen to the predetermined temperature, a large amount of reduction components is supplied to the NOx catalyst 41. According to the SOx poisoning recovery control as carried out in this manner, the NOx catalyst 41 is exposed to a high-temperature and fuel-rich atmosphere so that the SOx occluded in the NOx catalyst 41 is released and purified.

The ECU 60 executes either the above-mentioned sub-injection or fuel addition control as the catalyst temperature raising control. Specifically, when the temperature of the NOx catalyst 41 has been raised to the predetermined temperature under the control of the catalyst temperature, the reducing agent addition control is carried out. In this reducing agent addition control, the air fuel ratio of the exhaust gas flowing into the NOx catalyst 41 is made rich by adding fuel from the reducing agent addition valve 16 to the exhaust gas.

Here, note that the air fuel ratio of the exhaust gas is lowered to some extent according to the catalyst temperature raising control as mentioned above, but it is preferable to further lower the air fuel ratio of the exhaust gas (e.g., air fuel ratio=20) by decreasing the degree of opening of the throttle valve 31. With this, in the reducing agent addition control, it is possible to bring the air fuel ratio of the exhaust gas into a desired rich air fuel ratio while suppressing the amount of fuel added from the reducing agent addition valve 16 to a minimum.

The reducing agent added to the exhaust gas according to the reducing agent addition control acts to reduce the SOx occluded in the NOx catalyst 41 on one hand, and further raise the temperature of the NOx catalyst 41 on the other hand. If the reducing agent still continues to be added after the temperature of the NOx catalyst 41 has reached the predetermined temperature, there is a possibility that the temperature of the NOx catalyst 41 might be raised excessively.

In order to cope with such a situation, the ECU 60 performs intermittent rich control in which fuel is intermittently added to the exhaust gas from the reducing agent addition valve 16 in the reducing agent addition control. In this case, the air fuel ratio of the exhaust gas flowing into the NOx catalyst 41 comes to alternately repeat a rich state and a lean state. When the air fuel ratio of the exhaust gas becomes rich, the SOx occluded in of the NOx catalyst 41 is released and purified, and at the same time the temperature of the NOx catalyst 41 is raised by the oxidation reaction heat of fuel, whereas when the air fuel ratio of the exhaust gas becomes lean, the heat of the NOx catalyst 41 is transmitted to the exhaust gas, so the temperature of the NOx catalyst 41 is accordingly decreased.

As the air fuel ratio of the exhaust gas alternately repeats the rich state and the lean state in this manner in the reducing agent addition control, the NOx catalyst 41 repeats a temperature rise and a temperature fall whereby it is possible to recover or regenerate the SOx poisoning while suppressing an excessive rise in the temperature of the NOx catalyst 41.

Figure 2:
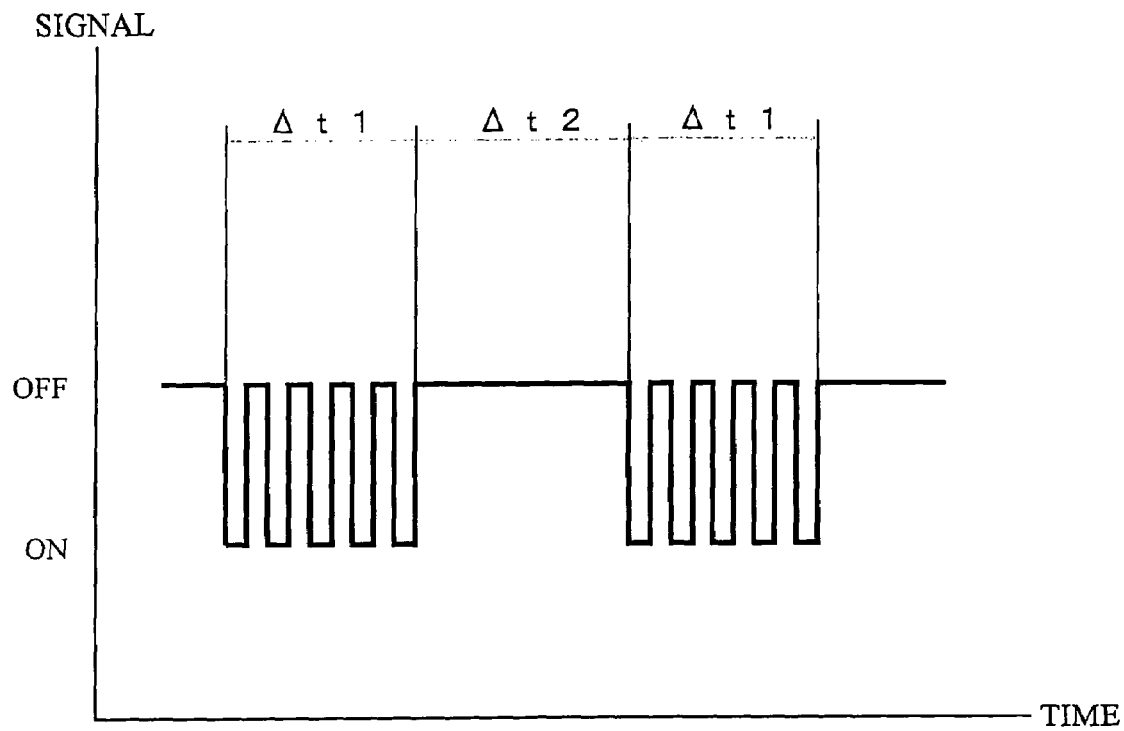
FIG. 2 is a time chart showing a valve-opening command signal for opening a reducing agent addition valve in the course of the execution of SOx poisoning recovery control according to one embodiment of the present invention.
Figure 3:
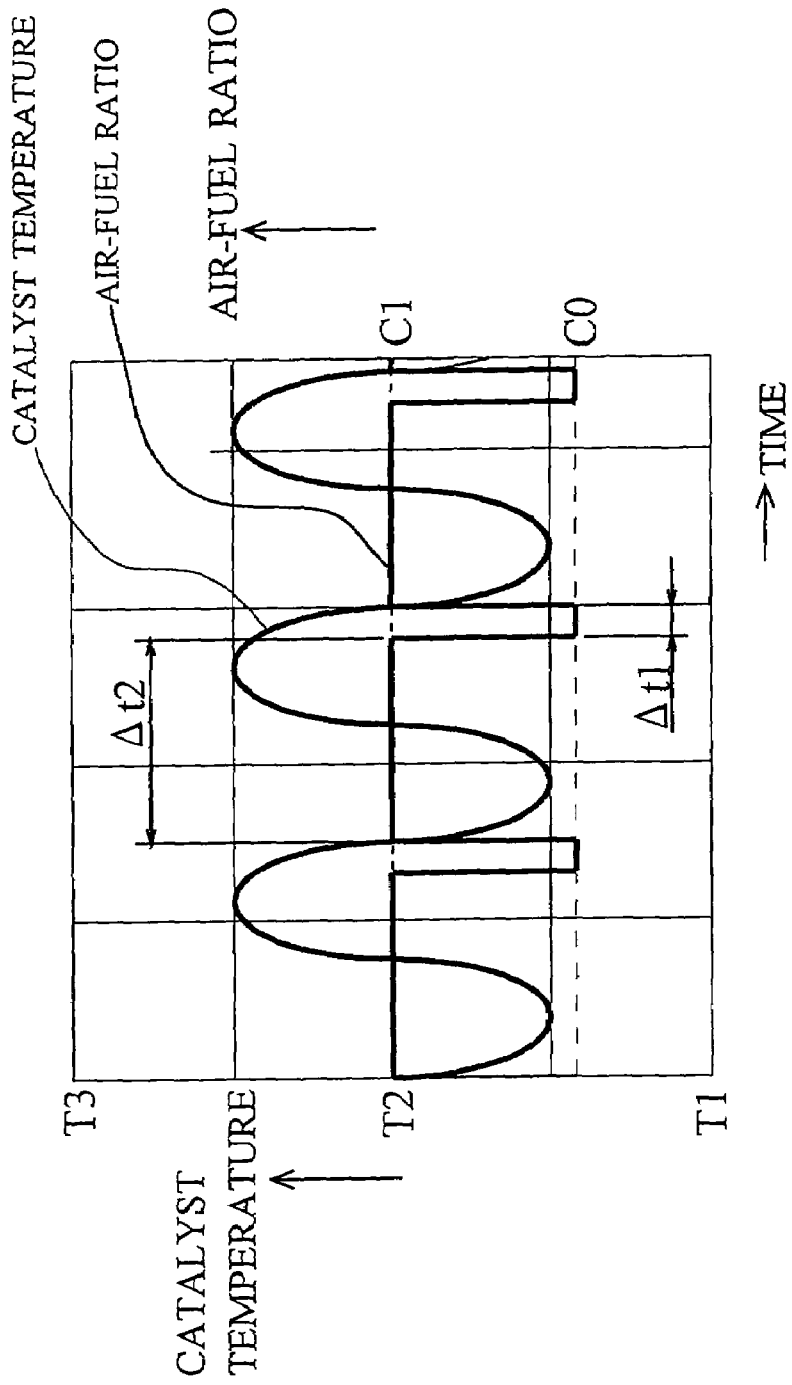
FIG. 3 is a time chart showing that the change of the air fuel ratio of an exhaust gas flowing into a NOx catalyst and the change of the temperature of the NOx catalyst when a reducing agent is controlled to be added in the course of the execution of the SOx poisoning recovery control are represented on the same time axis.

FIG. 2 is one example of a time chart that illustrates a command signal (valve-opening command signal) output from the ECU 60 to the reducing agent addition valve 16 during the execution of the SOx poisoning recovery control in this embodiment. FIG. 3 is one example of a time chart that illustrates the change of the air fuel ratio of the exhaust gas flowing into the NOx catalyst 41 and the change of the temperature of the NOx catalyst 41 during the reducing agent addition control in the course of execution of the SOx poisoning recovery control on the same time axis. Here, note that in FIG. 3, temperatures T1 and T2 correspond to a predetermined temperature range (about 600-650° C. for example) to which the temperature of the NOx catalyst 41 is raised according to the catalyst temperature raising control, and temperature T3 corresponds to an upper limit temperature (700° C. for example) at which there is no fear that the function of the NOx catalyst will be impaired due to its overheating.

In FIG. 2, when the temperature of the NOx catalyst 41 is the predetermined temperature (about 600-650° C.), the ECU 60 intermittently outputs a valve-opening command signal to open the reducing agent addition valve 16 over a predetermined fuel supply period $\Delta t1$. The fuel supply period $\Delta t1$ corresponds to a rich step in the present invention.

In this case, the reducing agent addition valve 16 is controlled to intermittently inject atomized fuel, so the air fuel ratio of the exhaust gas flowing into the NOx catalyst 41 becomes rich. At that time, the ECU 60 controls the reducing agent addition valve 16 and the metering valve 15 so as to bring the air fuel ratio of the exhaust gas into a rich air fuel ratio (C0 shown in FIG. 3, for instance, air-fuel ratio=14.2).

Subsequently, the ECU 60 stops the output of the valve-opening command signal over a predetermined stop or idle period $\Delta t2$ so as to suppress the overheating of the NOx catalyst 41. The stop period $\Delta t2$ corresponds to a lean step in the present invention.

In this case, the reducing agent addition valve 16 does not add fuel to the exhaust gas, so the air fuel ratio of the exhaust gas flowing into the NOx catalyst 41 becomes lean.

Thus, when the ECU 16 alternately executes the rich step and the lean step, the air fuel ratio of the exhaust gas comes to alternately repeat a rich state and a lean state, as shown in FIG. 3, and the temperature of the NOx catalyst 41, though causing a response delay with respect to the operation of the reducing agent addition valve 16, comes to alternately repeat a temperature rise and a temperature fall corresponding to the repetition of the rich step and the lean step.

Figure 4:
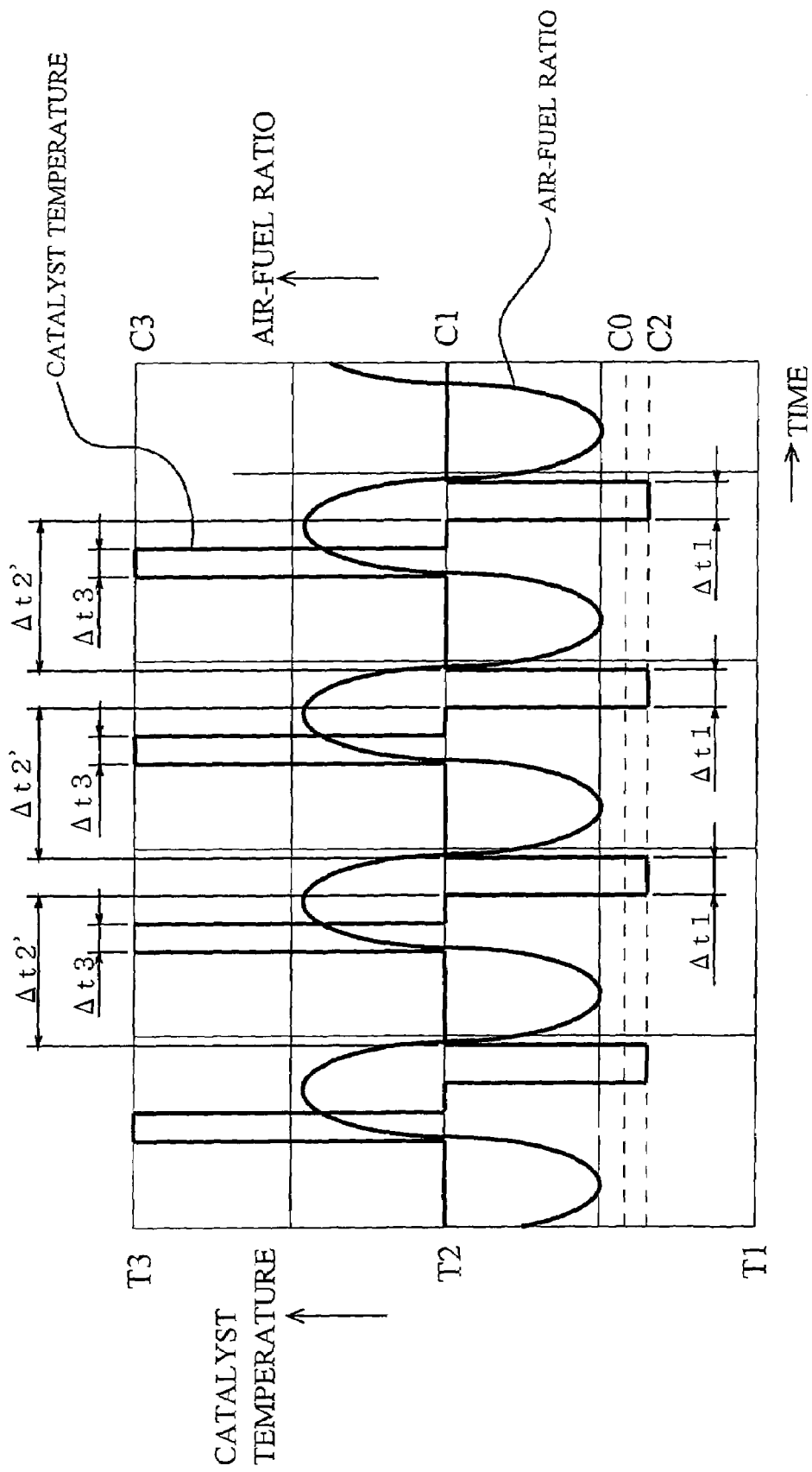
FIG. 4 is a timing chart showing that the change of the air fuel ratio of an exhaust gas flowing into an NOx catalyst and the change of the temperature of the NOx catalyst when a reducing agent is controlled to be added in the course of the execution of the SOx poisoning recovery control according to the embodiment of the present invention are represented on the same axis.

Next, reference will be made to the case where the SOx poisoning recovery control is carried out when the internal combustion engine 1 is operating at high speed. FIG. 4 is one example of a time chart that illustrates the change of the air fuel ratio of the exhaust gas flowing into the NOx catalyst 41 and the change of the temperature of the NOx catalyst 41 during the reducing agent addition control in the course of execution of the SOx poisoning recovery control according to this embodiment on the same time axis, as in FIG. 3.

At the time of the high speed operation of the engine 1, the temperature of the exhaust gas temperature of the internal combustion engine becomes high, so the NOx catalyst also becomes high. In addition, since the amount of exhaust gas discharged from the internal combustion engine 1 increases at the high speed operation thereof, a large amount of reducing agent (fuel) is needed so as to bring the air fuel ratio of the exhaust gas flowing into the NOx catalyst into the predetermined rich air fuel ratio. As the large amount of reducing agent is supplied to the NOx catalyst 41, the oxidation reaction heat generated in the NOx catalyst 41 increases. Accordingly, the NOx catalyst 41 comes to easily rise but not easily fall in temperature when the SOx poisoning recovery control is executed during the high speed operation of the engine 1.

Thus, when the SOx poisoning recovery control is performed during the high speed operation, it is necessary to shorten the fuel supply period $\Delta t1$ as well as to lengthen the stop period $\Delta t2$ in comparison with the case where the SOx poisoning recovery control is performed during the normal operation(medium speed operation, low speed operation, or idle operation, etc.) of the engine 1.

For example, the ECU 60 sets the fuel supply period $\Delta t1$ to 7 sec and the stop period $\Delta t2$ to 8 sec when the SOx poisoning recovery control is performed during the normal operation of the engine 1, whereas it sets the fuel supply period $\Delta t1$ to 4 sec and the stop period $\Delta t2$ to 34 sec when the SOx poisoning recovery control is performed during the high speed operation of the engine 1. The fuel supply period $\Delta t1$ and the stop period $\Delta t2$ in this case are determined in accordance with the exhaust gas temperature TEX and the temperature of the NOx catalyst 41 for instance.

When the fuel supply period $\Delta t1$ and the stop period $\Delta t2$ are set in this manner, the time required for the SOx poisoning recovery control during the high speed operation (i.e., the time required from the start of the SOx poisoning recovery control to the end thereof (the time at which the NOx catalyst is recovered (or regenerated) from SOx poisoning)) becomes longer than the SOx poisoning recovery control during the normal operation. As the time required for the SOx poisoning recovery control increases, the efficiency of the SOx poisoning recovery control is decreased, thus giving rise to a possibility that fuel economy (consumption), engine emissions and the like might be deteriorated. In addition, if the operation time of the SOx poisoning recovery control is fixed, it will be difficult to recover and regenerate the SOx poisoning to a satisfactory extent.

Accordingly, in this embodiment, in cases where the SOx poisoning recovery control is executed when the exhaust gas temperature is high such as at the time of the high speed operation, the ECU 60 controls such that the air fuel ratio of the exhaust gas in the fuel supply period $\Delta t1$ is made lower than a predetermined rich air fuel ratio C0 (see C0 shown in FIG. 4).

In details, ECU 60 makes the air fuel ratio of the exhaust gas in the fuel supply period $\Delta t1$ lower with increasing the length of the stop period $\Delta t2$. In that case, the ECU 60 may determine the air fuel ratio of the exhaust gas based on the length of the stop period $\Delta t2$ immediately before the fuel supply period $\Delta t1$.

Here, note that it has been considered that white smoke is generated when the air fuel ratio of exhaust gas becomes lower than a predetermined rich air fuel ratio (for example, air-fuel ratio=14.2 or below). However, the inventor for the present invention has found through keen and earnest experiments and verification that when the fuel supply period $\Delta t1$ is short and the stop period $\Delta t2$ is long, white smoke does not generate even if the air fuel ratio of exhaust gas is made much lower than the predetermined rich air fuel ratio, that is, even if lowered up to an air fuel ratio of 13.5, for example, as shown at C2 in FIG. 4.

Therefore, even if the fuel supply period $\Delta t1$ is short, by lowering the air fuel ratio of exhaust gas in the fuel supply period $\Delta t1$ from the predetermined rich air fuel ratio, it is possible to suppress a decrease in the amount of the SOx released from the NOx catalyst 41 without inviting the generation of white smoke.

Moreover, in this embodiment, there is provided an excessively lean period $\Delta t3$ within a stop period $\Delta t2'$, as shown in FIG. 4, in which the air fuel ratio of exhaust gas is set a value (C3 shown in FIG. 4, for instance, air-fuel ratio=30) higher than the predetermined lean air fuel ratio (C1 shown in FIG. 4, for instance, air-fuel ratio=20). The air fuel ratio of exhaust gas in the excessively lean period $\Delta t3$ is set in such a manner that it becomes higher in accordance with the increasing length of the stop period $\Delta t2$.

As methods for raising the air fuel ratio of exhaust gas in the excessively lean period $\Delta t3$, there are exemplified a method of increasing the degree of opening of the throttle valve 31, a method of decreasing the degree of opening of the EGR valve 51, a method of supplying secondary air to the exhaust gas at a location upstream of the NOx catalyst 41, and so on.

When any of these methods is executed, the thermal capacity of the exhaust gas increases in accordance with the increasing amount of the exhaust gas, so the exhaust gas temperature accordingly lowers, and the amount of heat transmitted from the NOx catalyst 41 to the exhaust gas increases. As a result, the temperature of the NOx catalyst 41 comes to fall in a short time.

With the provision of the excessively lean period $\Delta t3$ within the stop period $\Delta t2'$ in this manner, the temperature of the NOx catalyst 41 comes to fall in a short time, so it is possible to shorten the stop period $\Delta t2'$. That is, the length of the stop period $\Delta t2'$ shown in FIG. 4 can be further shortened (stop period $\Delta t2'$<stop period $\Delta t2$).

Although the length and timing of the excessively lean period $\Delta t3$ are not particularly limited, it is preferable to restore the air fuel ratio of the exhaust gas to the predetermined lean air fuel ratio at the end of the stop period $\Delta t2'$. This is because if the air fuel ratio of exhaust gas at the end of the stop period $\Delta t2'$ is higher than the predetermined lean air fuel ratio, the fuel added from the reducing agent addition valve 16 has to be increased upon switching into the fuel supply period $\Delta t1$.

Figure 5:
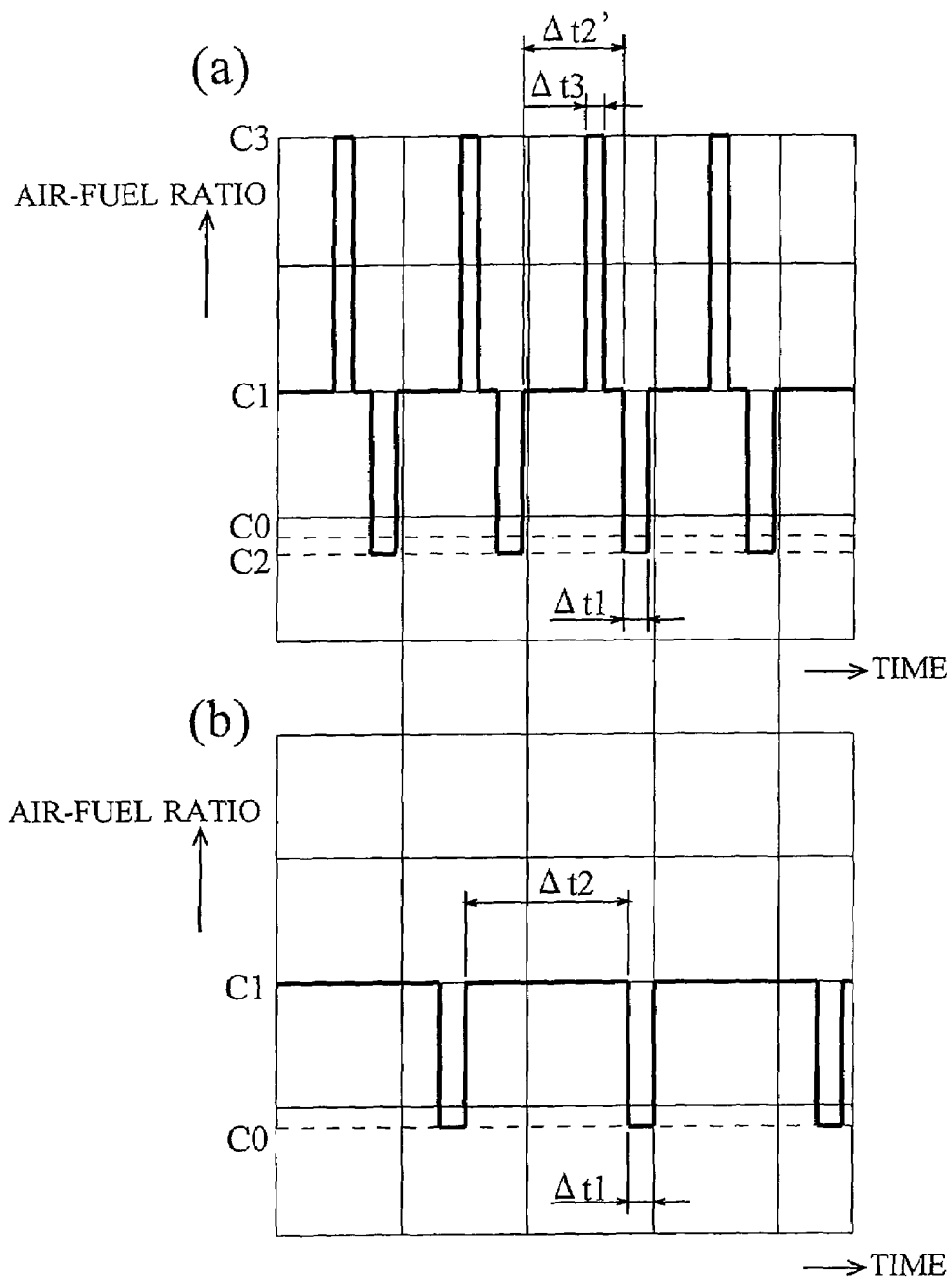
FIGS. 5A and 5B are time charts for comparison between the changes of the air fuel ratios of the exhaust gases flowing into the NOx catalysts in reducing agent addition control shown in FIG. 3 and FIG. 4, respectively, in the course of the execution of the SOx poisoning recovery control.

FIGS. 5A and 5B are time charts for comparison between the changes of the air fuel ratios of the exhaust gases flowing into the NOx catalysts during the reducing agent addition control shown in FIG. 3 and FIG. 4, respectively, in the course of execution of the SOx poisoning recovery control, wherein FIG. 5A corresponds to FIG. 4 and FIG. 5B corresponds to FIG. 3. Here, note that in FIGS. 5A and 5B, the time scales on the axis of abscissa are the same.

By providing the excessively lean period $\Delta t3$ within the stop period $\Delta t2'$, as shown in FIG. 5A, it is possible to shorten the length of the stop period from the one $\Delta t2$ shown in FIG. 5B into the one $\Delta t2'$ shown in FIG. 5A. As a consequence, the lean step is shortened, so the frequency of executions of the rich step can be increased.

Hereinafter, reference will be made to the detailed content of processing of the ECU 60 for such SOx poisoning recovery control according to this embodiment. In this connection, note that the SOx poisoning recovery control includes the catalyst temperature raising control and the reducing agent addition control.

Figure 6:
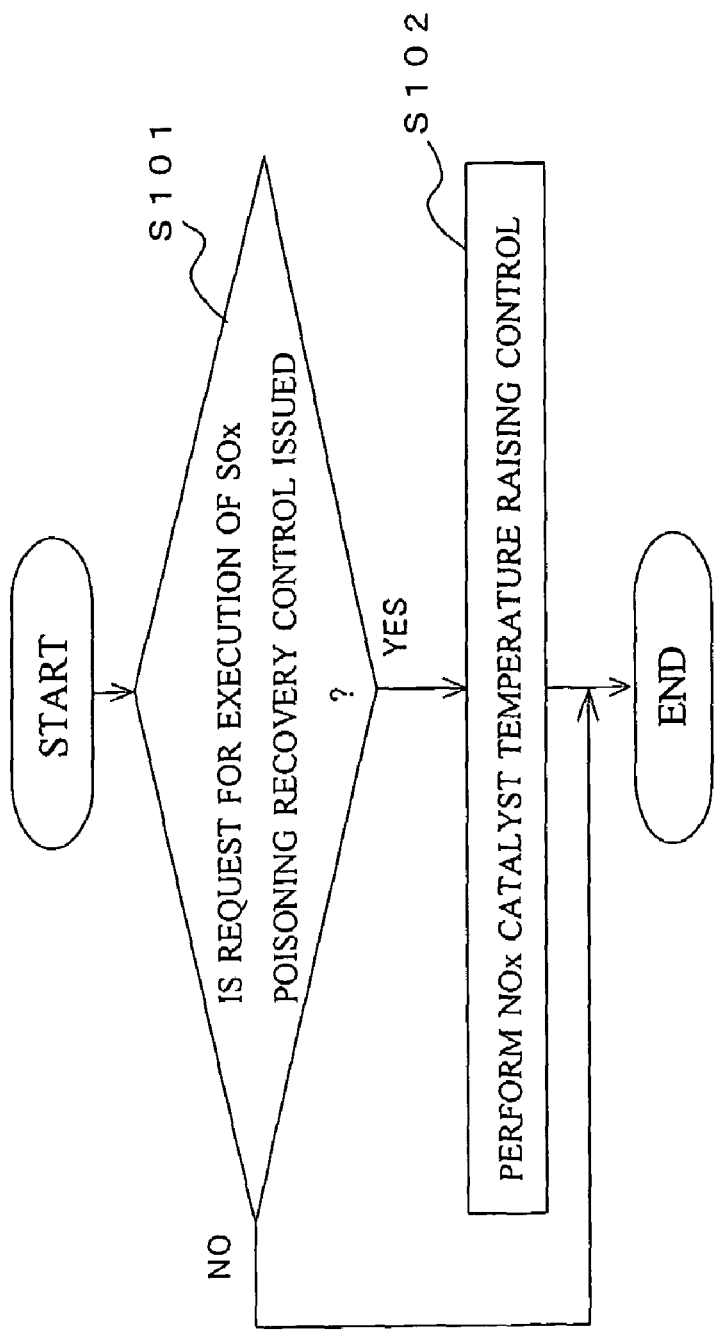
FIG. 6 is a flowchart showing the procedure (routine) of execution of catalyst temperature raising control performed in the SOx poisoning recovery control according to the embodiment of the present invention.

FIG. 6 is a flowchart that illustrates a catalyst temperature raising control routine. This routine is executed at predetermined time intervals during the operation of the internal combustion engine 1.

In the catalyst temperature raising control routine, first in step S101, it is determined whether a request for execution of SOx poisoning recovery control is issued, that is, whether SOx poisoning to the NOx catalyst 41 is in progress.

Specifically, when a predetermined time has elapsed from the time point of the last execution of SOx poisoning recovery control (i.e., from the time point at which the execution of the last SOx poisoning recovery control was completed), or when the detection signal of the NOx sensor 63 after execution of rich spike control exceeds a predetermined value, or when the mileage or distance traveled from the last execution of the SOx poisoning recovery control becomes greater than a predetermined distance, it is determined that a request for execution of SOx poisoning recovery control is issued.

When a negative determination is made in step S101, the execution of this routine is once terminated, whereas when a positive determination is made in step S101, the control flow proceeds to step 102. In step 102, by executing the above-mentioned catalyst temperature raising control, the temperature of the NOx catalyst 41 is raised to a predetermined temperature (e.g., 600-650° C.) or above. After execution of the step 102, this routine is terminated.

Figure 7:
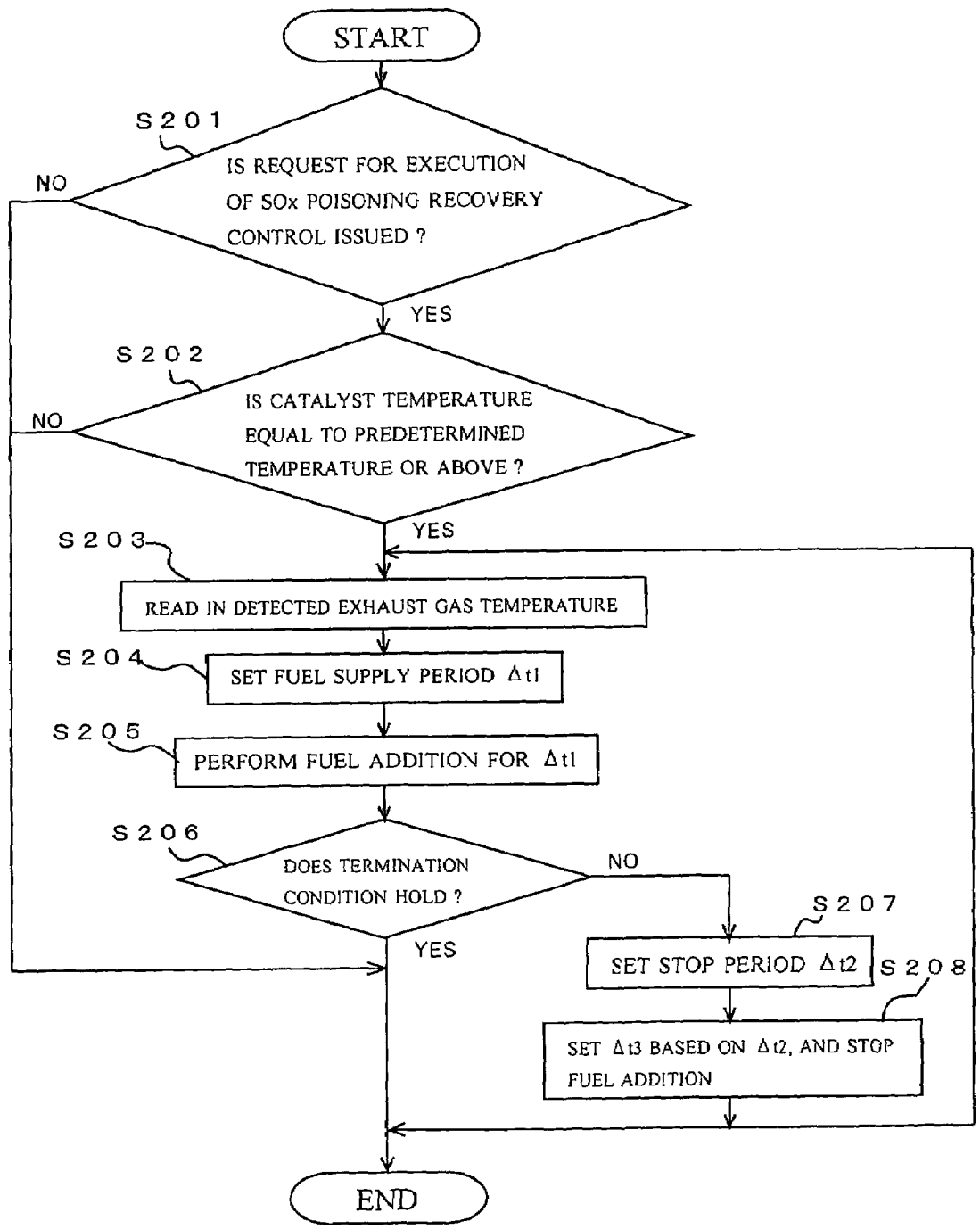
FIG. 7 is a flowchart showing the procedure (routine) of execution of reducing agent addition control performed in the SOx poisoning recovery control according to the embodiment of the present invention.

FIG. 7 is a flowchart that illustrates a reducing agent addition control routine. Similar to the catalyst temperature raising control routine, this routine is executed by the ECU 60 at predetermined time intervals during the operation of the internal combustion engine 1.

In the reducing agent control routine, first in step S201, it is determined whether a request for execution of SOx poisoning recovery control is issued. This method of determination is similar to that in step 101 in the above-mentioned catalyst temperature raising control routine.

When a negative determination is made in step S201, the execution of this routine is once terminated, whereas when a positive determination is made in step S201, the control flow proceeds to step 202.

When a positive determination is made in step 201, the temperature of the NOx catalyst 41 is rising under the catalyst temperature raising control or will reach a predetermined temperature (e.g., 600-650° C.). Thus, in step 202, it is further determined whether the temperature of the NOx catalyst 41 reaches the predetermined temperature (e.g., 600-650° C.). The temperature of the NOx catalyst 41 can be estimated, for example, from the exhaust gas temperature TEX detected by the exhaust gas temperature sensor 62.

When a negative determination is made in step S202, the execution of this routine is once terminated, whereas when a positive determination is made in step S202, the control flow proceeds to step 203.

In step S203, the exhaust gas temperature TEX detected by the exhaust gas temperature sensor 62 is read in.

In step S204, the fuel supply period $\Delta t1$ is decided using the exhaust gas temperature TEX and the temperature of the NOx catalyst 41 as parameters. For example, the fuel supply period $\Delta t1$ is set such that it becomes shorter in accordance with the higher exhaust gas temperature TEX and the higher temperature of the NOx catalyst 41.

In step S205, fuel is added from the reducing agent addition valve 16 to the exhaust gas during the fuel supply period $\Delta t1$ set in step S204.

In step S206, it is determined whether the SOx poisoning recovery control termination condition holds. For example, as such SOx poisoning recovery control termination conditions, there can be exemplified the following ones; the execution time of the reducing agent addition control is longer than or equal to a predetermined time, and the integrated or accumulated value of the fuel supply period $\Delta t1$ is longer than or equal to a predetermined time, etc.

When a positive determination is made in step S206, the execution of this routine is once terminated, whereas when a negative determination is made in step S206, the control flow proceeds to step S207.

In step S207, the stop period $\Delta t2$ is set using the exhaust gas temperature TEX and the temperature of the NOx catalyst 41 as parameters. For example, the stop period $\Delta t2$ is set such that it becomes longer in accordance with the higher exhaust gas temperature TEX and the higher temperature of the NOx catalyst 41.

Here, note that in this embodiment, the excessively lean period $\Delta t3$ is provided within the stop period $\Delta t2$. It is assumed that the air fuel ratio of exhaust gas in the excessively lean period $\Delta t3$ is set based on the length of the stop period $\Delta t2$ set in step S207. Specifically, the air fuel ratio of exhaust gas in the excessively lean period $\Delta t3$ is set higher with increasing length of the stop period $\Delta t2$.

In step S208, the addition of fuel from the reducing agent addition valve 16 to the exhaust gas is stopped according to the stop period $\Delta t2$ set in step S207. Here, though the stop period $\Delta t2$ may be set as a duration for which the fuel addition is stopped, it is preferred that in the case of the excessively lean period $\Delta t3$ being provided within the stop period $\Delta t2$, a stop period $\Delta t2'$ be set which is shorter than the stop period $\Delta t2$. Accordingly, the stop period $\Delta t2'$ may be decided by correcting the stop period $\Delta t2$ based on the air fuel ratio of exhaust gas in the excessively lean period $\Delta t3$, so that the operation of the reducing agent addition valve 16 can be stopped according to the stop period $\Delta t2'$.

After execution of the step S208, the processes in step S203 and onward are executed again. When the step S204 is executed again, the ECU 60 will perform characteristic control in this embodiment.

That is, when the fuel supply period $\Delta t1$ is set again in step S204, the air fuel ratio of exhaust gas in the fuel supply period $\Delta t1$ is set based on the length of the stop period $\Delta t2$ that has been set in the immediately preceding step S207. In details, the air fuel ratio of exhaust gas is set lower with increasing length of the stop period $\Delta t2$ set in step S207.

Thus, according to the execution of the catalyst temperature raising control routine and the reducing agent addition control routine, the air fuel ratio of exhaust gas in the fuel supply period $\Delta t1$ is made lower with increasing length of the stop period $\Delta t2$, and hence a decrease in the amount of the SOx released from the NOx catalyst 41 can be suppressed. As a result, decrease in the efficiency of the SOx poisoning recovery control can be suppressed.

Moreover, the excessively lean period $\Delta t3$ is provided within the stop period $\Delta t2$, and the air fuel ratio of exhaust gas in the excessively lean period $\Delta t3$ is made higher with increasing length of the stop period $\Delta t2$. With such an arrangement, the stop period $\Delta t2$ can be shortened. Consequently, the frequency of executions of the fuel supply period $\Delta t1$ is increased, thus making it possible to ensure a sufficient amount of SOx released from the NOx catalyst 41. Accordingly, decrease in the efficiency of the SOx poisoning recovery control can be suppressed.

Thus, it is possible to efficiently reduce and remove the sulfur oxides (SOx) that are gradually deposited or accumulated in the NOx catalyst in accordance with the operation of the internal combustion engine, and hence the exhaust gas purifying function of the NOx catalyst can be recovered or regenerated.

Although in this embodiment, reference has been made to the case where the operating condition of the internal combustion engine 1 is in high-speed operation, the present invention is not limited to such a case but instead can be applied to cases where the air fuel ratio of exhaust gas in the fuel supply period $\Delta t1$ and/or the stop period $\Delta t2$ can be decided based on the length of the stop period $\Delta t2$ regardless of the operating condition of the internal combustion engine 1. In addition, the air fuel ratio of exhaust gas in the fuel supply period $\Delta t1$ and/or the stop period $\Delta t2$ can also be decided based on the length of the supply period Δt1. Moreover, in the case of the high-speed operating condition of the internal combustion engine 1, the air fuel ratio of exhaust gas in the fuel supply period Δt1 and/or the stop period Δt2 can be decided based on the operating condition of the internal combustion engine 1 but not based on the length of the stop period Δt2 or the fuel supply period Δt1.

Further, the NOx catalyst 41 may be carried on a diesel particulate filter. In this case, a carrier layer made of alumina for example is formed on the peripheral wall of each of exhaust gas inlet passages and each of exhaust gas outlet passages of the filter, that is, on opposite side surfaces of each partition wall and on the inner wall surface of each fine holes in each partition wall, and an NOx storage reduction catalyst is supported on this carrier layer.

Although in this embodiment, the amount of exhaust gas in the stop period Δt2 is changed based on the length of the stop period Δt2, the amount of exhaust gas may be increased in a uniform manner regardless of the length of the stop period Δt2. For example, the amount of the exhaust gas flowing into the NOx catalyst 41 may be increased by increasing the degree of opening of the throttle valve 31 in the stop period Δt2 by a predetermined quantity, or by decreasing the degree of opening of the EGR valve 51 in the stop period Δt2 by a predetermined quantity, or by supplying a predetermined amount of secondary air to the exhaust gas flowing into the NOx catalyst 41. Further, in case where provision is made for a bypass passage (not shown) connected with the exhaust system 40 so as to bypass the NOx catalyst 41, the flow rate or amount of the exhaust gas flowing through the bypass passage in the stop period Δt2 may be decreased by a predetermined amount. Furthermore, in case where provision is made for an exhaust throttle valve (not shown) for adjusting the flow rate of the exhaust gas flowing into the NOx catalyst 41, the degree of opening of the exhaust throttle valve may be increased by a predetermined amount.

When the amount of the exhaust gas flowing into the NOx catalyst 41 is increased in this manner regardless of the length of the stop period Δt2, the amount of heat transmitted from the NOx catalyst 41 to the exhaust gas increases, so the stop period Δt2 can be shortened, as a result of which the time required for the SOx poisoning recovery control can be shortened regardless of the length of the stop period Δt2 and/or the length of the fuel supply period Δt1.

While the invention has been described in terms of preferred embodiments, those skilled in the art will recognize that the invention can be practiced with modifications within the spirit and scope of the appended claims.

What is claimed is:

1. Catalyst recovery method comprising:
   a rich step of bringing an exhaust gas flowing into an NOx storage reduction catalyst installed on an exhaust passage of a lean-burn internal combustion engine into a reducing atmosphere thereby to raise the temperature of said NOx storage reduction catalyst and to release sulfur oxides occluded in said NOx storage reduction catalyst;
   a lean step of bringing said exhaust gas flowing into said NOx storage reduction catalyst into an oxidative atmosphere thereby to lower the temperature of said NOx storage reduction catalyst; and
   a recovery step of executing said rich step and said lean step in an alternate manner thereby to recover sulfur poisoning of said NOx storage reduction catalyst;
   wherein the air fuel ratio of said exhaust gas flowing into said NOx storage reduction catalyst in at least one of said rich step and said lean step is controlled based on the length of at least one of said rich step and said lean step; and
   wherein the air fuel ratio of said exhaust gas flowing into said NOx storage reduction catalyst in said rich step is made lower than a predetermined rich air fuel ratio when the length of said rich step decreases.

2. The catalyst recovery method as set forth in claim 1, wherein the air fuel ratio of said exhaust gas flowing into said NOx storage reduction catalyst in at least part of the period of said lean step is made higher with increasing length of said lean step.

3. The catalyst recovery method as set forth in claim 1, wherein the air fuel ratio of said exhaust gas flowing into said NOx storage reduction catalyst in at least part of the period of said lean step is made higher with decreasing length of said rich step.

* * * * *